(12) United States Patent
Matsumoto

(10) Patent No.: US 7,528,375 B2
(45) Date of Patent: May 5, 2009

(54) RADIATION DETECTION CIRCUIT AND RADIOLOGICAL IMAGING APPARATUS USING THE SAME

(75) Inventor: Takashi Matsumoto, Hamura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/478,728

(22) Filed: Jul. 3, 2006

(65) Prior Publication Data
US 2007/0051893 A1  Mar. 8, 2007

(30) Foreign Application Priority Data
Aug. 31, 2005  (JP) ............... 2005-250521

(51) Int. Cl.
*G01T 1/24*  (2006.01)
(52) U.S. Cl. ................. 250/370.01
(58) Field of Classification Search ............ 250/370.01
See application file for complete search history.

(56) References Cited

U.S. PATENT DOCUMENTS

| | | | |
|---|---|---|---|
| 6,169,287 B1 * | 1/2001 | Warburton | 250/370.1 |
| 6,369,393 B1 * | 4/2002 | Jordanov | 250/395 |
| 6,509,565 B2 | 1/2003 | Nygard et al. | |
| 6,521,894 B1 * | 2/2003 | Iwanczyk et al. | 250/370.11 |
| 6,765,213 B2 * | 7/2004 | Shahar et al. | 250/370.09 |
| 2002/0145115 A1 * | 10/2002 | Nygard et al. | 250/370.09 |
| 2003/0128599 A1 * | 7/2003 | Numai et al. | 250/370.01 |
| 2005/0067571 A1 | 3/2005 | Yanagita et al. | |

FOREIGN PATENT DOCUMENTS

| | | | |
|---|---|---|---|
| JP | 2002-243858 A | 8/2002 |
| JP | 2005-017142 A | 1/2005 |
| JP | 2005-106553 A | 4/2005 |

* cited by examiner

*Primary Examiner*—David P Porta
*Assistant Examiner*—Jessica L Eley
(74) *Attorney, Agent, or Firm*—Miles & Stockbridge P.C.

(57) ABSTRACT

There is a need for high-precision detection timing in a radiological imaging apparatus using a semiconductor detector so as to decrease time variations against a noise and easily correct process variations. A radiation detection circuit includes: a semiconductor detector; charge accumulation means connected to the semiconductor detector; a circuit to discriminate timing of a signal generated from the charge accumulation means based on a specified threshold value; a shaper 1 to limit a band from the charge accumulation means using a first time constant; a shaper 2 to limit a band from the charge accumulation means using a second time constant; a circuit 1 to hold an analog peak value 1 for the shaper 1; and a circuit 2 to hold an analog peak value 2 for the shaper 2. The radiation detection circuit performs a signal process to generate timing correction data based on the analog peak values 1 and 2 and correct timing data from the timing discriminator circuit.

20 Claims, 12 Drawing Sheets

RADIATION DETECTION CIRCUIT AND RADIOLOGICAL IMAGING APPARATUS USING THE SAME

CLAIM OF PRIORITY

The present application claims priority from Japanese patent application No. 2005-250521 filed on Aug. 31, 2005, the content of which is hereby incorporated by reference into this application.

FIELD OF THE INVENTION

The present invention relates to a radiological imaging apparatus such as a PET (Positron Emission Tomography) apparatus and a radiation detection circuit used for the apparatus. Specifically, the invention relates to a radiation detection circuit that reduces an error in detection timing dependent on positions for radiation to enter a semiconductor detector.

BACKGROUND OF THE INVENTION

Conventionally, there have been a radiation detection circuit and a radiological imaging apparatus for detecting simultaneously incident gamma rays at the same timing (see JP-A No. 243858/2002). In this case, a fast shaper and a slow shaper are supplied with electric signals detected by pixels. A current controller limits a timing signal formed by the fast shaper to a level smaller than or equal to a specified slew rate. Specifically, FIG. 3 in JP-A No. 243858/2002 discloses an example of the shaper that controls slew rates of timing signals dependent on the incident radiation to uniform timings.

SUMMARY OF THE INVENTION

Prior to this application, the applicants examined the timing signal generation technology in coincidence measurement (hereafter referred to as coincidence measurement) of proton and annihilation radiation. The measurement is needed for a radiological imaging apparatus using a radiation detector (hereafter referred to as a semiconductor detector) made of semiconductor devices. The proton is generated from a positron nuclide. The annihilation radiation has the same energy as 511 keV generated upon annihilation of an electron existing in a human body annihilates and travels 180□ reversely. Compared to a conventional scintillator, the radiological imaging apparatus using the semiconductor detector: 1) excels in detector-specific energy resolution, enables the simultaneous use of medicines containing multiple nuclides with different energies, and improves the image contrast; and 2) is capable of further miniaturizing a detector's physical shape, improving the space resolution compared to the conventional scintillator, and acquiring finer images. On the other hand, the semiconductor detector shows the following disadvantages. 1) The radiation stopping power is smaller than the conventional scintillator so that applying the same radiation dosage to a specimen decreases an effective count. 2) A position where the radiation enters the detector varies a generated signal waveform at a contribution ratio between electron transfer and hole transfer, causing a mobility difference ten times or more. The detection time deviation becomes up to 200 to 300 ns when a difference between generated current waveforms exceeds a given threshold level. This increases a probability of causing events that cannot be assumed to occur at the same time as timing data, decreasing the effective count. 3) Since the radiation stopping power is low, there is a high probability of scattering (hereafter referred to as Compton scattering distinguished from body scattering in the body water or bone) an incident radiation in the detector. The quantity of charge generated in the detector is irregular. Since the voltage waveform gradient changes with reference to an ideal signal waveform, the detection time varies with the energy to decrease the effective count. Generally, a timing window assumed to be the equal time approximately ranges from 10 to 20 ns for the coincidence measurement on the PET apparatus. When there is a detection timing difference of approximately 10 to 20 ns or smaller between two radiations traveling 180° opposite to each other, the two radiations are assumed to be detected at the same time. When the detection timing difference exceeds those values, the two radiations are not assumed to be detected at the same time even though they enter the semiconductor detector almost simultaneously. Such detection time variation greatly decreases a ratio of the number of events (hereafter referred to as the effective count) recognized to be the equal time. Accordingly, this greatly increases the time (diagnostics time for patients) to acquire data needed for the reconstruction. The semiconductor detector is hardly practicable as medical equipment and is therefore not commercialized. To solve this problem, FIG. 3 in JP-A No. 243858/2002 proposes a slew rate control circuit according to the timing signal generation technology.

However, the circuit in JP-A No. 243858/2002 pays no attention to degradation of time variations due to noise so that the slew rate can match the transfer speed of an electron hole. Further, it is difficult to correct process variations for each input signal. The applicants originally found these problems of the prior art.

The following shows representative examples of the invention. A radiation detection circuit according to the invention is connected to an output side of a semiconductor detector, allows the semiconductor detector to supply a current pulse signal having intensity corresponding to an input energy of radiation, and outputs input energy information and incident timing data of the radiation based on the current pulse signal intensity. Information about a contribution of electron is acquired from the current pulse signal intensity and is output so that a digital data correction circuit connected to an output side of the radiation detection circuit can correct the incident timing data.

A radiation detection circuit according to the invention includes: a charge-sensitive amplifier that is connected to an output side of a semiconductor detector, receives a current pulse signal with an intensity corresponding to a radiation input energy from the semiconductor detector, and outputs a voltage signal proportional to the current pulse signal intensity; a first shaper that uses a first time constant to limit and pass a band of a voltage signal output from the charge-sensitive amplifier; a second shaper that uses a second time constant smaller than the first time constant to limit and pass a band of a voltage signal output from the charge-sensitive amplifier; a first peak hold that holds an analog peak hold value for an output signal from the first shaper; a second peak hold that holds an analog peak hold value for an output signal from the second shaper; and a comparator that compares a voltage signal output from the charge-sensitive amplifier with a specified voltage threshold value and outputs a comparison result as timing data. The radiation detection circuit is constructed to be connectable to a digital data correction circuit at an output side so that timing correction data for the timing data can be generated based on a first analog peak value for an output signal from the first shaper and a second analog peak value for an output signal from the second shaper.

A radiological imaging apparatus according to the invention is composed of: a semiconductor detector; charge accumulation means connected thereto; a first shaper; a second shaper; a first peak hold; a second peak hold; an analog/digital converter circuit (hereafter referred to as an ADC); a signal correction circuit; a coincidence measurement signal processing circuit; a reconstruction processor; an apparatus control console; a bed; and a gantry. Specifically, the radiological imaging apparatus includes: a semiconductor detector that is composed of a semiconductor device and outputs a current pulse signal with an intensity corresponding to a radiation input energy; a charge-sensitive analog signal detection circuit that is connected to the semiconductor detector, receives a current pulse signal output from the semiconductor detector, and outputs first timing data representing a timing for a radiation to enter the semiconductor detector, first energy data proportional to an incident radiation energy, and first electron contribution energy data proportional to a signal quantity contributed to electron transfer in the semiconductor detector; and a digital data correction circuit that corrects timing for a radiation to enter the semiconductor detector and outputs corrected timing data based on the first timing data, the first energy data, and the electron contribution energy data.

The invention can shorten the diagnostics imaging time in the radiological imaging apparatus and improve the diagnostics image contrast.

DETAILED DESCRIPTION OF THE PREFERRED EMBODIMENTS

Embodiments of the present invention will be described in further detail with reference to the accompanying drawings. Circuit devices constituting each block in the embodiments are formed on a single semiconductor substrate such as monocrystalline silicon by means of a known integrated circuit technology such as that applied to CMOS (complementary MOS transistor), but not limited thereto. As MOSFET (Metal Oxide Semiconductor Field Effect Transistor) circuit symbols, a symbol without arrow represents an N-type MOSFET (NMOS) and a symbol without arrow represents P-type MOSFET (PMOS). In the description below, MOSFET is simplified as MOS. Transistor devices used for the radiation detection circuit according to the invention are not limited to field-effect transistors (MOSFETs) containing an oxide film insulating film provided between a metal gate and a semiconductor layer. It is possible to use various known transistor devices such as a bipolar transistor, MISFET (Metal Insulator Semiconductor Field Effect Transistor), and the like.

Embodiment 1

Figure 1:
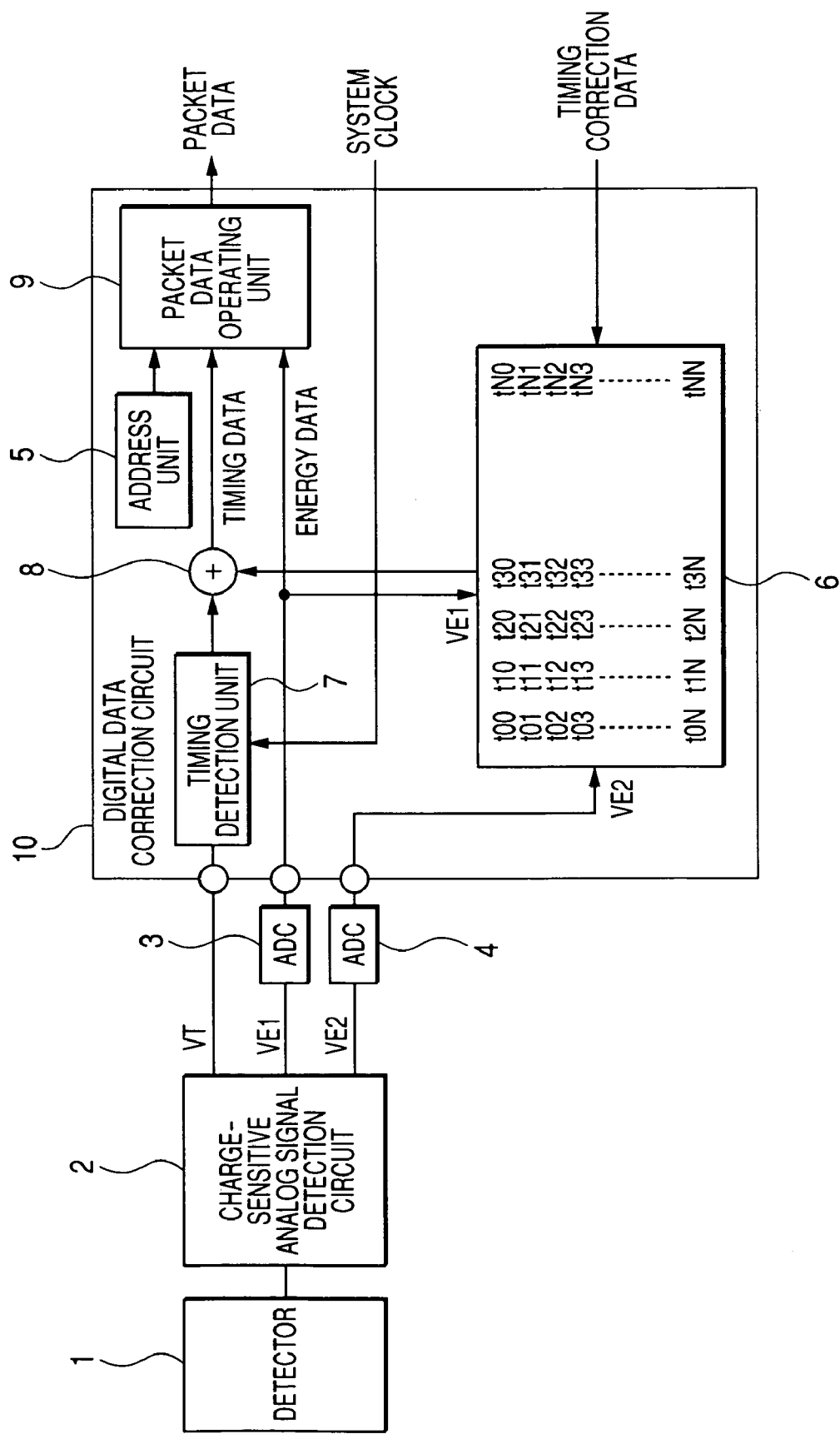
FIG. 1 shows a first embodiment of the radiation detection circuit in a PET/SPECT apparatus as an example of the radiological imaging apparatus according to the invention.

FIG. 1 shows a first embodiment of the radiation detection circuit in the PET/SPECT (Single Photon Emission Computed Tomography) apparatus as an example of the radiological imaging apparatus according to the invention. The PET/SPECT apparatus includes: a detector 1; a charge-sensitive analog signal detection circuit 2; analog/digital converters (ADCs) 3 and 4; and a digital data correction circuit 10. The digital data correction circuit 10 includes: a detector address unit 5; a timing correction data table unit 6; a timing detection unit 7 that converts a timing signal into timing data using a synchronized clock signal from the apparatus; a correction circuit 8; and a packet data generating unit 9. Generally, multiple detectors 1 are provided in the PET/SPECT apparatus so as to surround a test object. Each of all the detectors 1 is connected to the corresponding charge-sensitive analog signal detection circuit 2 on a one-to-one basis. The charge-sensitive analog signal detection circuit 2 amplifies a weak pulse signal from the detector 1. The charge-sensitive analog signal detection circuit 2 outputs signals VT, VE1, and VE2. The signal VT represents incident timing. The signal VE1 is proportional to incident energy. The signal VE2 is proportional to the quantity of incident signals that contributed to electron transfer in the detector 1. Though not specified, the charge-sensitive analog signal detection circuit 2 is preferably constructed as an ASIC (Application Specific Integrated Circuit) that integrates a charge-sensitive amplifier 13 and a comparator 14 in FIG. 2 to be described later. The signal VT is input to the timing detection unit 7 and is converted into timing data through a system clock. The signals VE1 and VE2 are converted into digital signals by the ADCs 3 and 4, respectively, and are then input to the digital data correction circuit 10. Though not specified, the digital data correction circuit 10 is preferably constructed as an FPGA (Field Programmable Gate Array) that integrates the address unit 5, the timing correction data table unit 6, the timing detection unit 7, the correction circuit 8, and the packet data generating unit 9. In the digital data correction circuit 10, a timing correction data table 6 is used to determine a timing signal correction value. Two pieces of energy data uniquely determine the correction value. The correction value is supplied to the correction circuit 8 disposed at the output side of the timing detection unit 7. The correction circuit 8 performs addition or subtraction between the timing signal output from the timing detection unit 7 and the correction signal output from the timing correction data table 6 to correct the timing signal. The correction circuit 8 then outputs the corrected timing signal. The corrected timing signal is supplied as timing data to the packet data generating unit 9. The address unit 5 generates an address signal. The address signal is supplied as address information to the packet data generating unit 9. The signal VE1 is output as a digital value from the ADC 3 and is input as energy data to the packet data generating unit 9. The packet data generating unit 9 unifies the address information, the timing data, and the energy data into one data packet and supplies it to the subsequent coincidence operating circuit to perform coincidence measurement for the entire PET/SPECT apparatus.

Figure 2:
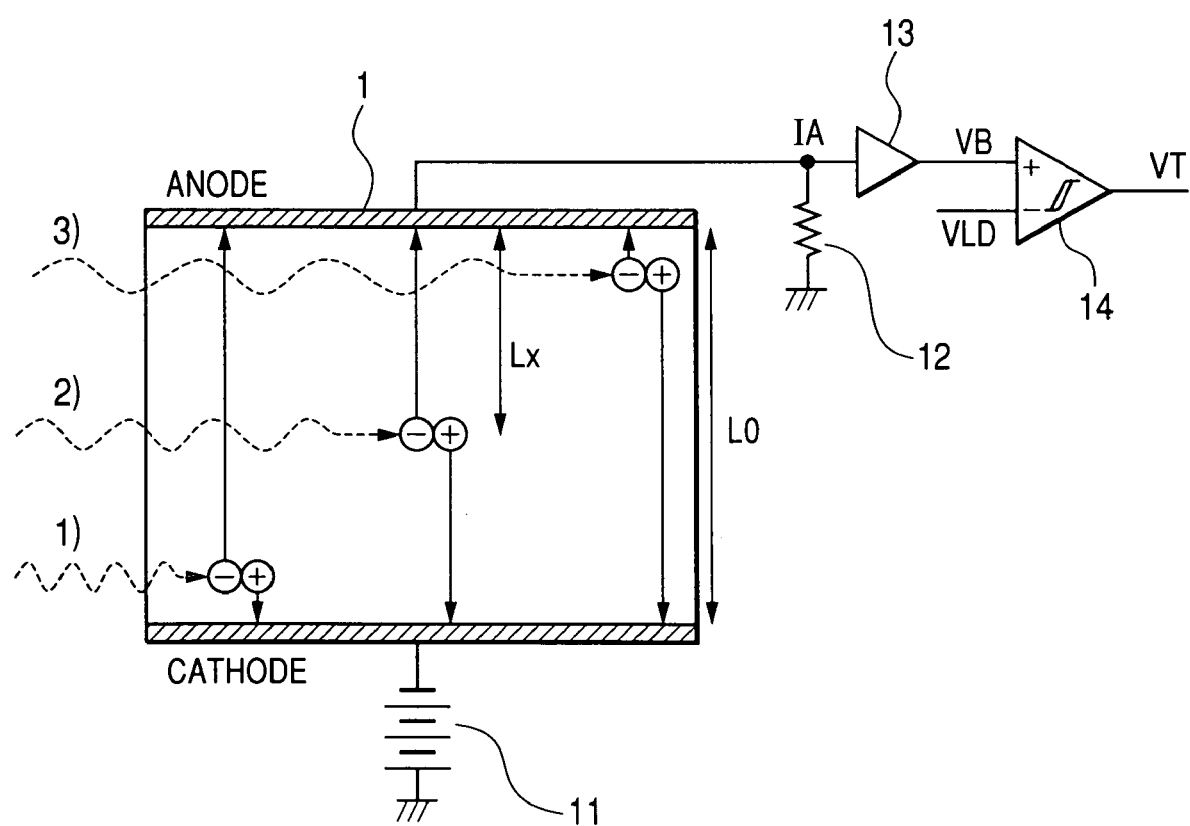
FIG. 2 shows details of a detector 1 in FIG. 1 and a VT output portion in a charge-sensitive analog signal detection circuit 2.

FIG. 2 shows details of the detector 1 and a VT output portion in the charge-sensitive analog signal detection circuit 2. The detector 1 has cathode and anode electrodes that are connected to a high-voltage power supply 11 and a ground resistance 12, respectively. The electrode (anode) corresponding to the ground resistance 12 is connected to an input side of the charge-sensitive amplifier 13. An output side of the charge-sensitive amplifier 13 is connected to an input side of the comparator 14. When output voltage VB reaches or exceeds a specified voltage threshold level VLD, the comparator 14 inverts signal VT appearing at its output terminal.

When a radiation enters the detector 1, the detector 1 generates an electron-hole pair corresponding to the absorbed energy. The electron transfers to the anode side and the electron hole transfers to the cathode side induced by an electric field applied by the high-voltage power supply 11. The transfer of the electron and the hole causes a current pulse IA that occurs at the input side of the charge-sensitive amplifier 13. The detector has a finite size. An output signal waveform composed of the current pulse IA varies with a position where the radiation enters. The reason follows. When the radiation enters near the cathode of the semiconductor detector, the electron hole pairing with the generated electron increases a ratio of contributing to the current pulse IA. On the contrary, when the radiation enters near the anode of the semiconductor detector, the generated electron increases a ratio (hereafter referred to as contribution of electron) of contributing to the current pulse IA. Generally, the electron mobility (transfer speed) is 10 times or higher than the hole mobility. A current waveform (output signal waveform) output from the detector 1 varies with positions where the radiation enters the detector. Let us suppose that L0 is a distance between the anode electrode and the cathode electrode and that Lx is a distance between the anode electrode and a place where the electron-hole pair occurred. When Lx/L0=1, the detector acquires the energy approximately equal to the current resulting from transfer of the electron. When Lx/L0=0.5, the electron and the hole each half contribute to the current. When Lx/L0=0, the generated current almost depends on transfer of the electron hole.

Figure 3:
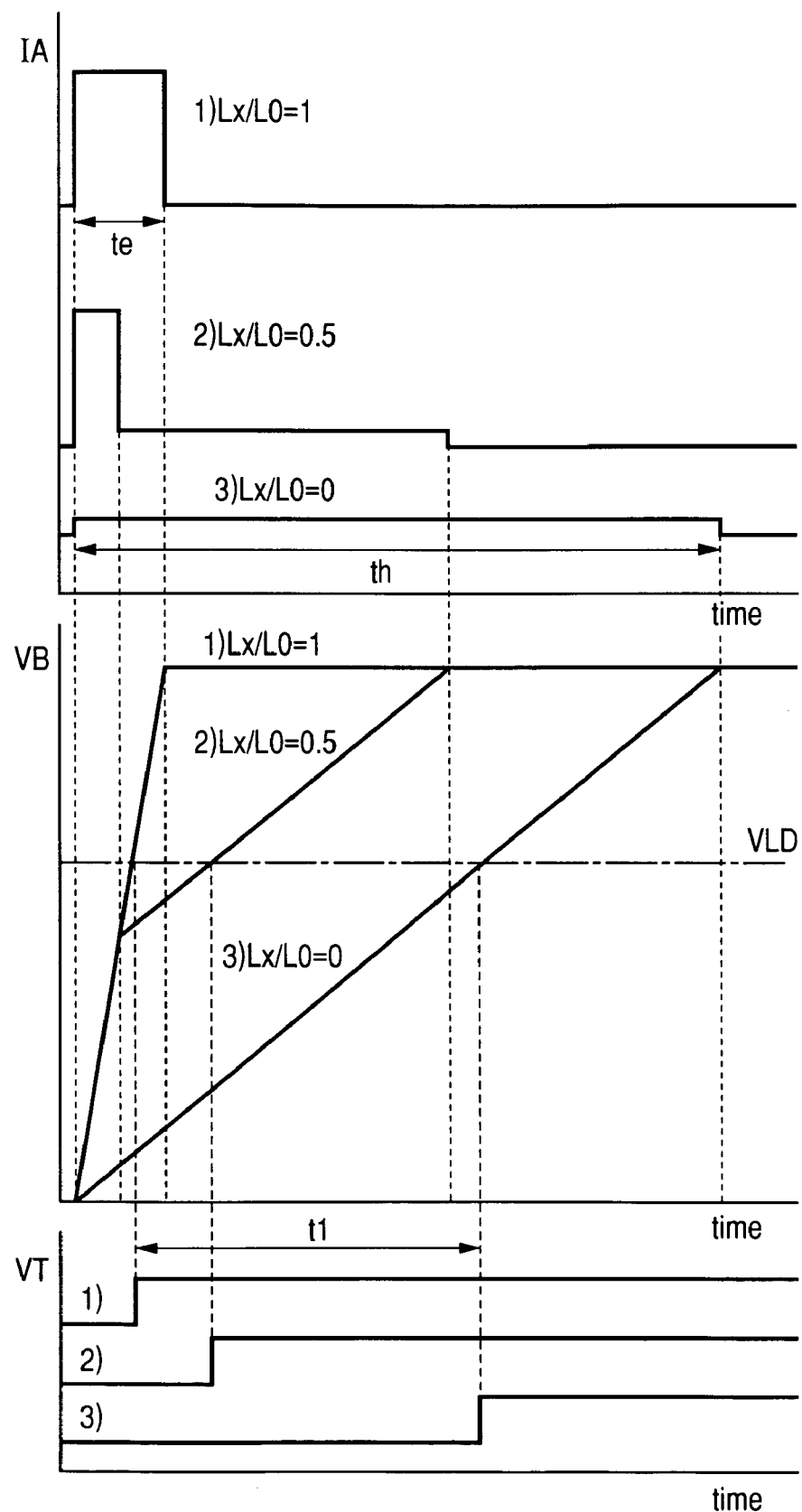
FIG. 3 shows relationship among a waveform of output current pulse IA from the detector in FIG. 2, a waveform of output voltage VB from a charge-sensitive amplifier 13, and a waveform of output voltage VT from a comparator 14.

FIG. 3 shows relationship among waveforms of the current pulse IA and the voltage VB and the signal VT. The current pulse IA occurs at the input side of the charge-sensitive amplifier 13 in FIG. 2. The voltage VB appears at the input side of the comparator 14. That is, the charge-sensitive amplifier 13 converts the IA into voltage to obtain the voltage VB. Based on the voltage VB, the comparator 14 outputs the signal VT using a specified voltage VLD as a threshold value. The signal VT detects incident timing. When the radiation is absorbed near the detector cathode, the signal waveform results with the contribution of electron almost set to 1 (100%). The timing is detected earliest. When the radiation is absorbed between the anode and the cathode to cause the contribution of electron set to 0.5 (50%), the comparator 14 outputs a rising signal at a timing later than the earliest timing. When the radiation is absorbed near the anode, the signal waveform results with the contribution of electron almost set to 0 (0%). The comparator 14 outputs a rising signal at the latest timing. The transfer time may depend on the construction of the detector 1 or values of voltages applied to the detector 1. Generally, when used for the PET apparatus, the electron transfer time (te) in the detector 1 ranges from 20 to 50 ns. The hole transfer time (he) in the detector 1 approximately ranges from 200 to 500 ns. In this case, depending on the voltage threshold value VLD for the comparator, there is a time difference of 200 to 300 ns between the earliest timing detection and the latest timing detection. This is a considerable problem in the coincidence measurement using the semiconductor detector. As will be described later, the radiation detection circuit according to the invention effectively solves this problem.

Figure 4:
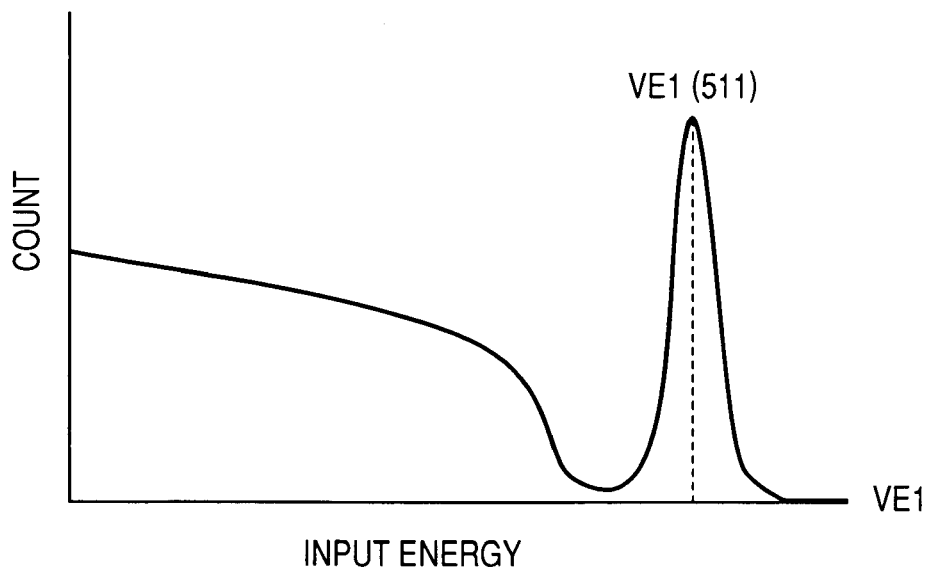
FIG. 4 shows an energy absorption spectrum when scattering occurs.

FIG. 4 shows scattering and absorption of a radiation in the detector 1. Specifically, FIG. 4 shows an energy absorption spectrum when scattering occurs. The detector 1 does not absorb all the energy of an incident radiation. It is known that the radiation is absorbed or scatters on a probability basis statistically depending on the device material, shape, and the radiation energy. Since the voltage VE1 in FIG. 1 is proportional to the incident energy, the voltage VE1 is used to represent an input energy here. In a region where the input energy VE1 is low, the count of absorption occurrences simply decreases. When the input energy exceeds a given value, the count of absorption occurrences suddenly increases to reach a specified value (e.g., 511 keV). At this time, the degree of scattering occurrence is minimal.

Figure 5:
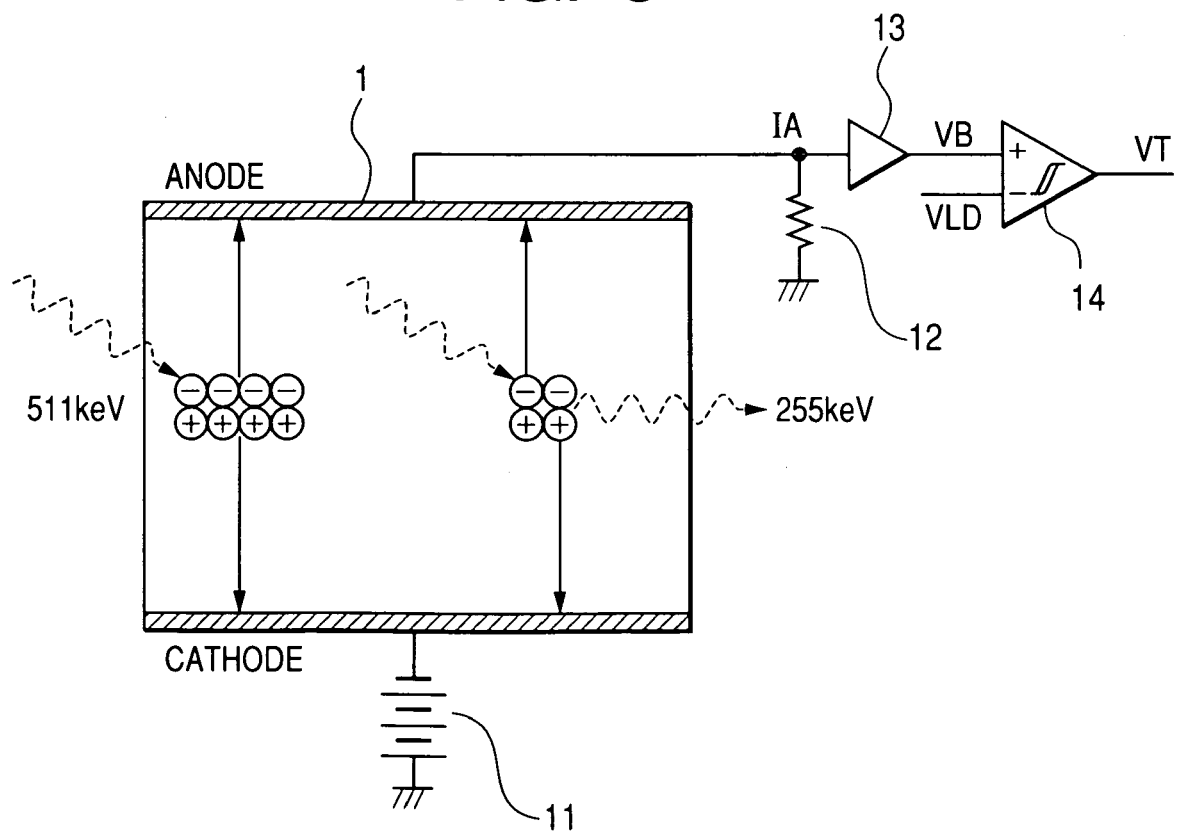
FIG. 5 shows details of the detector 1 in FIG. 1 and the VT output portion in the charge-sensitive analog signal detection circuit 2 and specifically shows a state where scattering occurs in the detector 1.

FIG. 5 specifically shows a state where scattering occurs in the detector 1. The detector 1 is connected to the high-voltage power supply 11 and the ground resistance 12. The electrode at the side of the ground resistance 12 is connected to the input side of the charge-sensitive amplifier 13. The output side of the charge-sensitive amplifier 13 is connected to the input side of the comparator 14. When output voltage VB reaches or exceeds the specified voltage threshold level VLD, the comparator 14 inverts signal VT appearing at its output terminal.

When a radiation enters the detector 1, the detector 1 generates an electron-hole pair corresponding to the absorbed energy. The electron transfers to the anode side and the electron hole transfers to the cathode side induced by an electric field resulting from the applied voltage. The transfer of the electron and the hole causes a current pulse IA that occurs at the input side of the charge-sensitive amplifier 13. The example here shows that the incident radiation provides the energy of 511 keV. The illustration on the left shows that all the energy is absorbed. The illustration on the right shows that half the energy is absorbed and the remaining half scatters. In either case, it takes the same amount of time for the generated electron and the hole to transfer to the anode and the cathode, respectively. In the latter case, the detector 1 outputs the current value half the former case.

Figure 6:
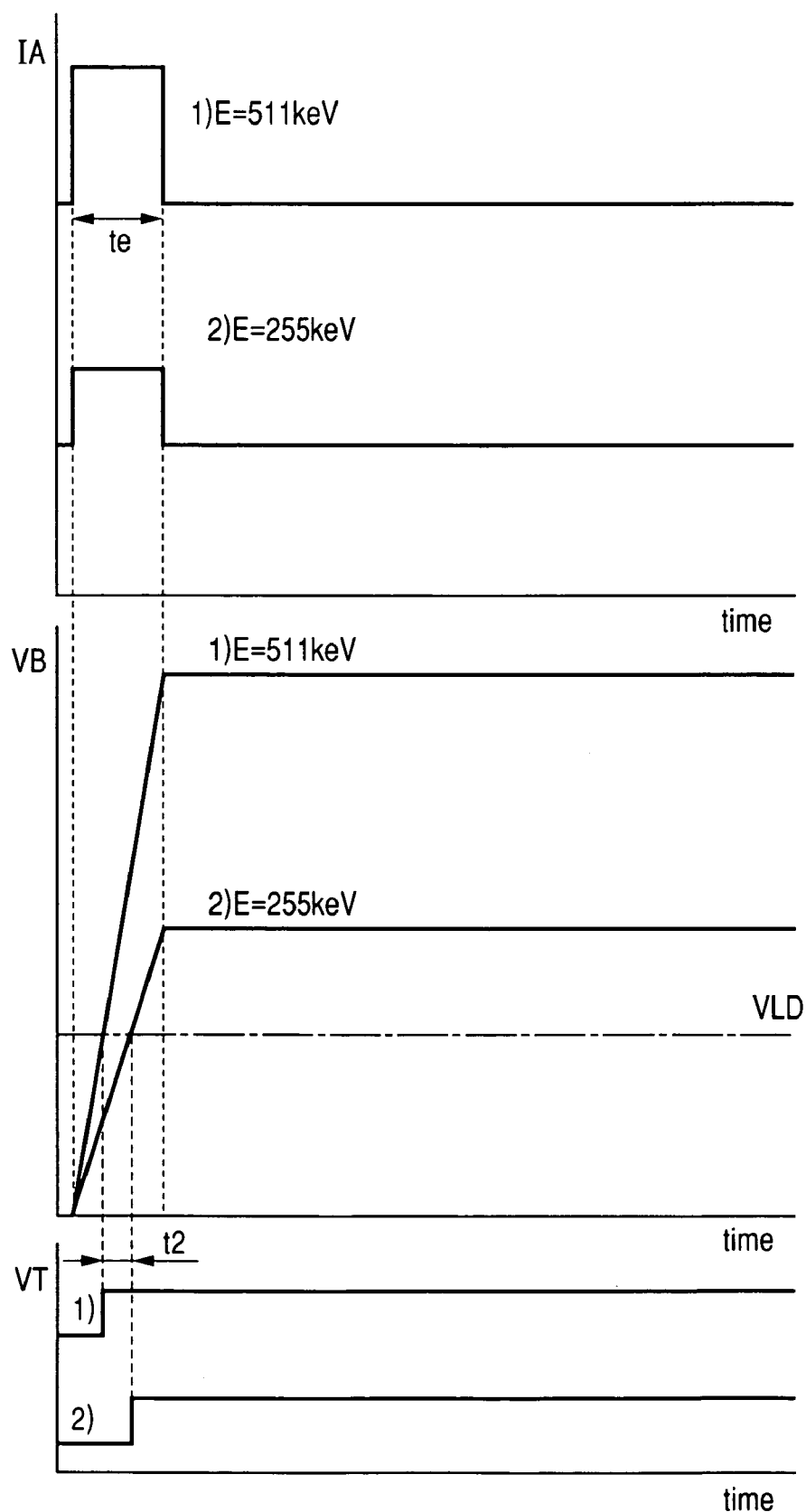
FIG. 6 shows relationship among a waveform of output current pulse IA from the detector in FIG. 2, a waveform of output voltage VB from the charge-sensitive amplifier 13, and a waveform of output voltage VT from the comparator 14 and specifically shows a case where two radiations entering with the same contribution of electron cause different energies as output currents.

FIG. 6 shows a waveform of the current pulse IA at the input side of the charge-sensitive amplifier 13, a waveform of the voltage VB at the input side of the comparator 14, i.e., at the output side of the charge-sensitive amplifier 13, and a waveform of the voltage VT at the output side of the comparator 14 when two radiations entering with the same contribution of electron cause different energies as output currents due to scattering, for example. Let us suppose that a waveform with the contribution of electron set to 100% changes input energies. When one energy is 511 keV and the other is 255 keV, for example, the number of electrons occurring near the cathode in the detector 1 changes. Both show no difference in the time interval (electron transfer time) te of the current pulse IA. However, the current values (pulse heights) differ from each other. In terms of waveforms of the voltage VB at the input side of the comparator 14, the energy of 255 keV shows a smaller gradient than the energy of 511 keV. When the comparator 14 uses the specified voltage threshold value VLD to compare energies, 255 keV delays by time t2 compared to 511 keV. As will be described later, the radiation detection circuit according to the invention effectively solves this problem.

Figure 7A:
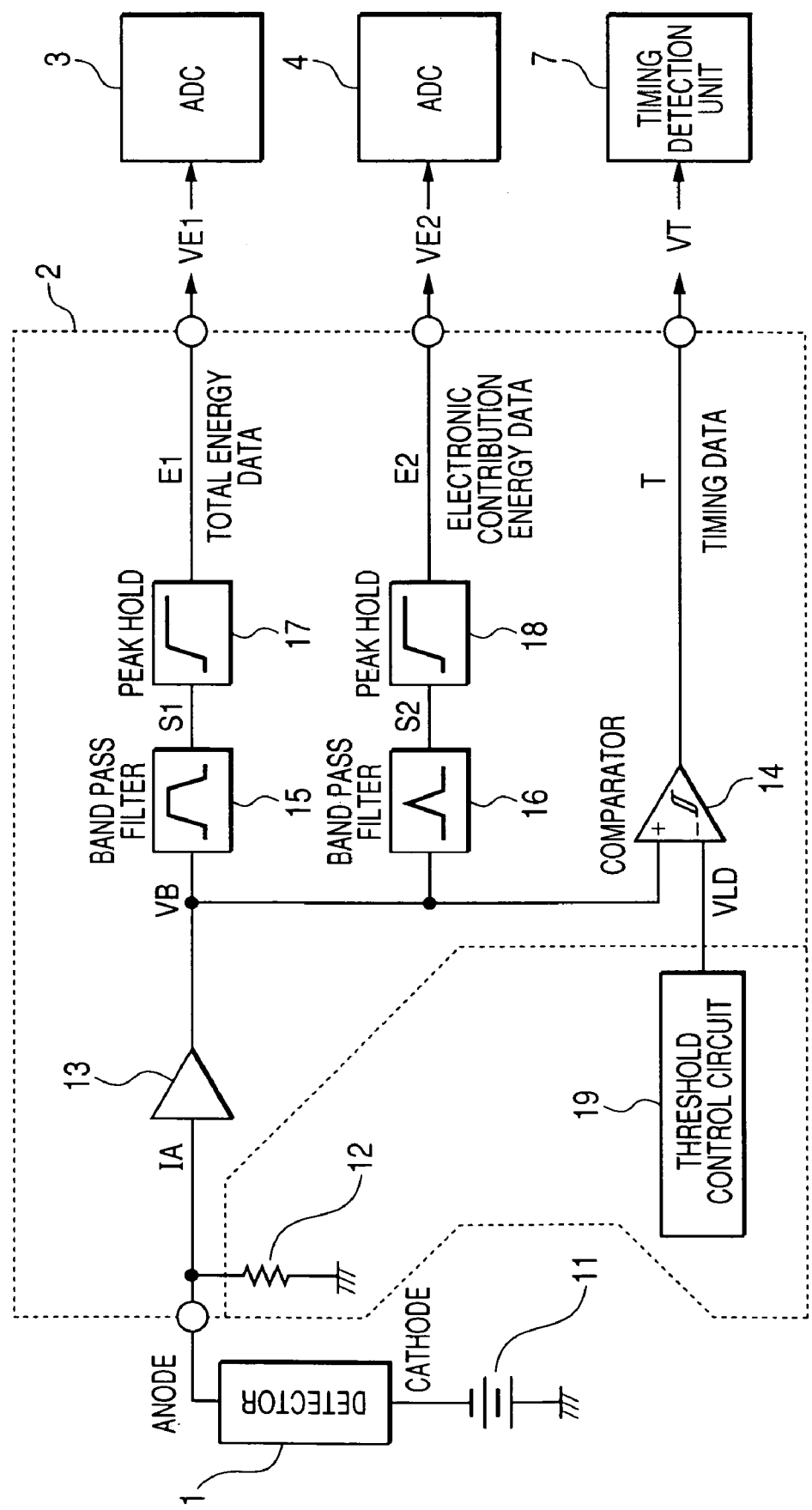
FIG. 7A shows in detail the charge-sensitive analog signal detection circuit 2 in FIG. 1.

FIG. 7A shows in detail the charge-sensitive analog signal detection circuit 2. One side (cathode side) of the detector 1 is connected to the high-voltage power supply 11. The other side (anode side) is connected to the input side of the charge-sensitive amplifier 13. The ground resistance 12 fixes an input to the charge-sensitive amplifier 13 to the GND level on an electric potential basis. The output side of the charge-sensitive amplifier 13 is connected to shapers 15 and 16 for different band restrictions, and to the comparator 14 as mentioned above with reference to FIGS. 2 and 5. The output side of the shaper 15 is connected to a peak hold 17. The peak hold 17 supplies a signal S1 output from the shaper 15. Similarly, the output side of the shaper 16 is connected to a peak hold 18. The peak hold 18 supplies a signal S2 output from the shaper 16. The signals S1 and S2, when output or input as voltages, are represented as VS1 and VS2, respectively. The comparator 14 is supplied with, as inputs, the output signal VB from the charge-sensitive amplifier 13 and the output signal VLD from a threshold control circuit 19. When VB becomes greater than or equal to VLD, the comparator reverses an output. The electron-hole pair is generated in the detector 1 and is converted into the voltage signal VB in the charge-sensitive amplifier 13. The voltage signal VB is then converted into the timing signal VT, and the energy signals VE1 and VE2. The timing signal VT is discriminated with reference to the specified voltage threshold value VLD. The energy signal VE1 indicates the input energy amount. The shaper 15 with a specified time constant removes noise from the energy signal VE1 and shapes its waveform. The shaper 16 has a specified time constant corresponding to the mobility of the electron out of the electron-hole pair. That time constant filters the electron transfer that contributes to the energy signal VE2. The converted signals are output from the charge-sensitive analog signal detection circuit 2. Terminals to output VE1 and VE2 are connected to the input sides of the ADC 3 and the ADC 4, respectively. A terminal to output the timing signal VT is directly connected to the timing detection unit 7 in the digital data correction circuit 10 without mediation of the ADC and the like.

As mentioned above, the charge-sensitive analog signal detection circuit 2 is preferably composed of known ASICs. There is no limitation on which devices to be integrated into a single ASIC. For example, it may be preferable to integrate the charge-sensitive amplifier 13, the comparator 14, the shapers 15 and 16, and the peak holds 17 and 18. The resistance 12 and the threshold control circuit 19 may be externally provided or also included in the integration.

Figure 7B:
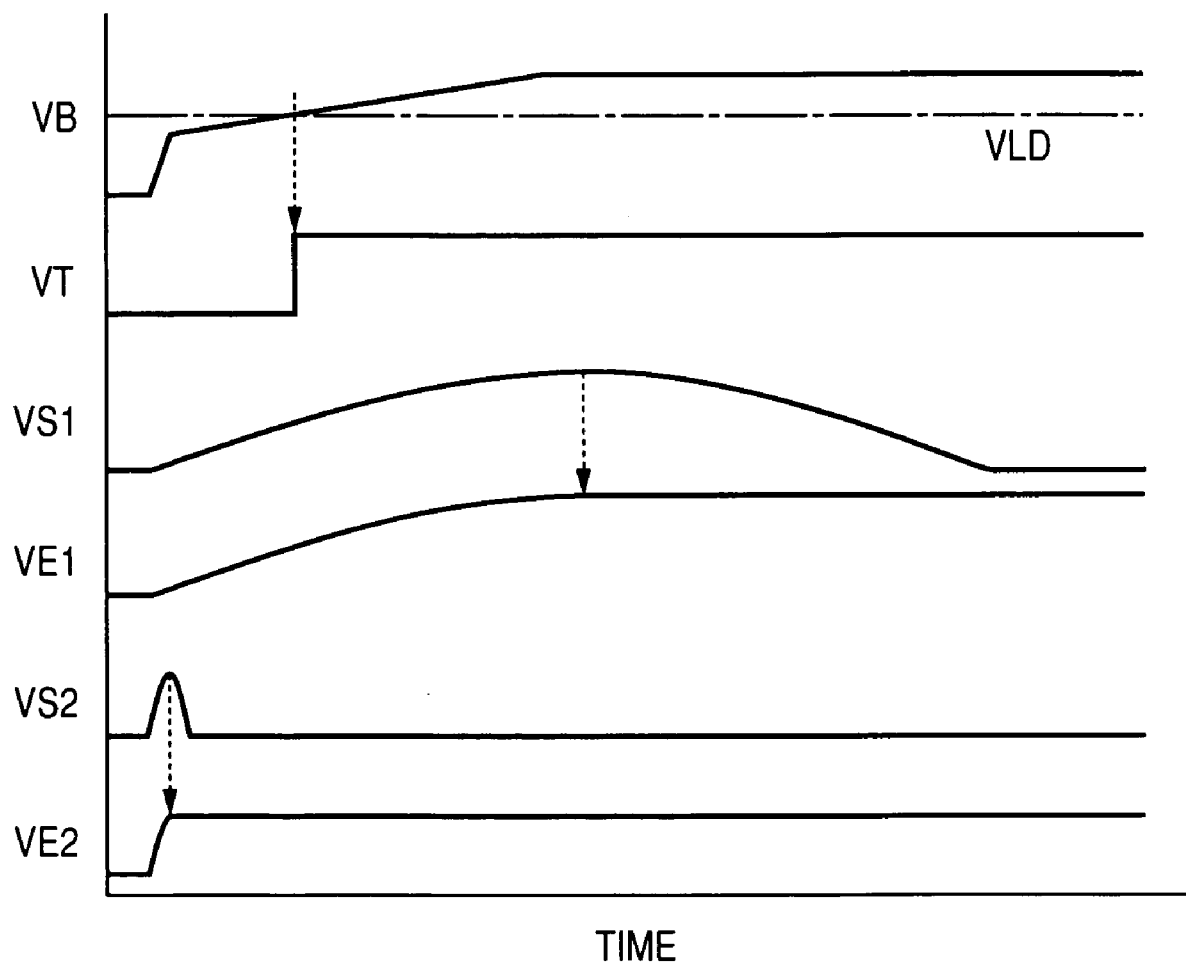
FIG. 7B shows an output signal VB from a charge-sensitive amplifier 13, output signals VS1 and VS2 from shapers 15 and 16 respectively, and output signals VE1, VE2, and VT from the charge-sensitive analog signal detection circuit 2 in FIG. 7A.

FIG. 7B shows transitional response waveforms at representative points in FIG. 7A. When VB reaches or exceeds VLD, VT changes from the L level to the H level. The peak hold holds peak values of VS1 and VS2 output from the shapers 15 and 16, respectively. At this time, the filter time constant for the shaper 15 is configured to be longer than the transfer time of the electron hole in the detector 1 to widen the pass band. This aims at enabling passage of information about all the energy, i.e., a total of the amount of electron contribution, the amount of hole contribution, and both signal components. On the other hand, the filter time constant for the shaper 16 is configured to be equivalent to the transfer time of the electron in the detector to narrow the pass band. This aims at possibly preventing passage of signal components other than the amount of electron contribution. This configuration makes it possible to acquire not only information about the input energy, but also information about the contribution of electron.

After acquired in this manner, the information about the contribution of electron can be used to find the correction value against the timing signal based on the relationship in FIG. 3. The VB waveform corresponding to each contribution of electron can be found beforehand. Accordingly, it is possible to find a time interval between the time when VT goes to the H level, i.e., the time when the waveform of NB corresponding to the contribution of electron crosses the horizontal line of VB=VLD, and the time when an actual event occurs. Correct timing data can be acquired using this time value to correct the timing signal output from the timing detection unit 7. It may be a good practice to select N contributions of electron, previously calculate correction values corresponding to the contributions of electron, and store the calculated correction values in a table. This method eliminates the need for calculating a correction value each time VE1 or VE2 is input, effectively accelerating the PET/SPECT apparatus.

Let us suppose that the above-mentioned scattering occurs in the detector 1. Also in this case, it is possible to rightly correct the timing signal based on the relationship in FIG. 6 to acquire timing data. Since VE1 is proportional to VB, monitoring VE1 determines the VB value. Consequently, a voltage value for the energy lost due to the scattering corresponds to a difference between VB and the voltage value equivalent to the energy originally attributed to the radiation. The electron transfer time te is uniquely determined by the device size of the detector 1 and a voltage applied to the detector 1. The value te is used to determine the time when the waveform of each VB changes from a monotonic increase to a constant state. The value te is used to find the gradient of a monotonically increasing portion between two waveforms. It is possible to find time t2 as an interval between two points where these waveform cross the horizontal line corresponding to VB=VLD. Correct timing data can be acquired by correcting the timing signal using t2. Similarly to the above-mentioned case, it may be a good practice to select VB values as many as N, previously calculate correction values corresponding to the values, and store the calculated correction values in a table. This method eliminates the need for calculating a correction value each time VE1 or VE2 is input, effectively accelerating the PET/SPECT apparatus.

The timing correction data table unit 6 in FIG. 1 is a two-dimensional matrix whose elements are two-dimensional data. The two-dimensional data is composed of: a correction value based on information VE2 about the above-mentioned contribution of electron; and a correction value based on total energy data VE1 indicating the energy quantity value decreased due to scattering. The contribution of electron varies with a position where the radiation enters the detector 1. The energy quantity varies with scattering of the radiation in the detector 1. The timing correction data table unit 6 can be used to correct the timing signal at a time by considering both variations. The use of the timing correction data table unit 6 is effective for accelerating the PET/SPECT apparatus.

Figure 8:
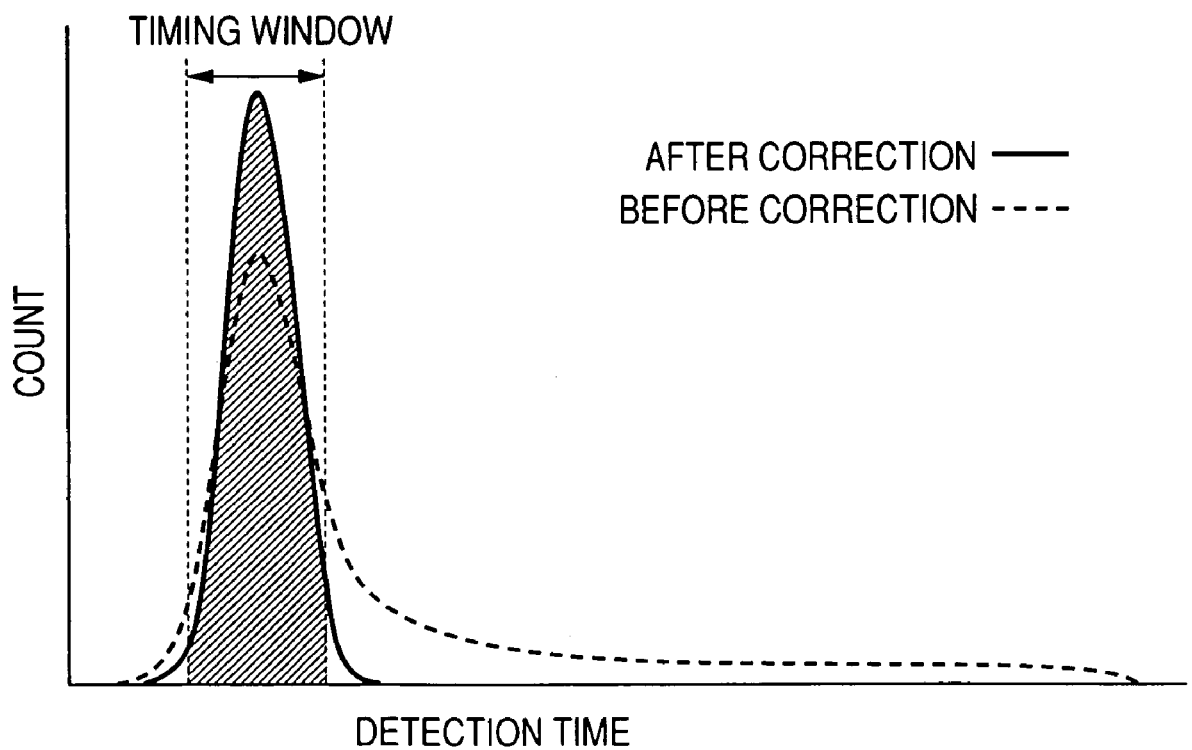
FIG. 8 shows timing distributions, before and after correction, output from the digital data correction circuit 10 in FIG. 1.

FIG. 8 shows timing distributions, before and after correction, output from the digital data correction circuit 10 in FIG. 1. With reference to FIG. 8, the following describes relationship between timing distributions before and after the correction. The detection time may delay when a change occurs in the contribution of electron and the input energy as mentioned above with reference to FIGS. 2 through 4. This delay can be uniquely found when the incident energy quantity and the contribution of electron are determined. The same applies to the case where the radiation scatters as mentioned above with reference to FIGS. 5 and 6. Accordingly, the timing signal can be corrected by supplying the digital data correction circuit 10 with the information such as the detection time VT, the energy quantity VE1, and the contribution of electron VE2. Distributions of timing detection times differ as follows. Before the correction, the distribution spreads widely as far as later times corresponding to low contribution ratios of electron mobility. After the correction, however, observational data samples gather near the true detection time. This increases the probability of assuming true coincidental events to be the equal time, thus increasing effective events in the observational data. As a result, this makes it possible to suppress a loss of effective data, the greatest disadvantage of the radiological imaging apparatus using the semiconductor detector. It becomes possible to acquire high-contrast or high-resolution images in the diagnostics time equivalent to that for the conventional radiological imaging apparatus.

The embodiment can minimize an influence of timing variations due to noise. A noise is generated mainly from the detector 1 or the charge-sensitive amplifier 13. The conventional technology as disclosed in JP-A No. 243858/2002 supplies a preamplifier output to the comparator via the current controller. This technology makes the VB waveform gradient gentle and degrades the ratio of signal intensity to noise intensity (S/N). By contrast, the embodiment does not use such a block as the current controller similar to a filter causing S/N degradation along the path to output timing data, i.e., the path containing the comparator 14 at the output side of the charge-sensitive amplifier 13. Consequently, it is possible to perform comparator operations in an excellent S/N condition and suppress variations of timing data VT due to noise.

The total energy data VE1 and the electron contribution energy data VE2 are signals output via the filter and are therefore subject to process variations. However, this type of variations simply results from device variations inherent in the circuit devices constituting the filter, not from the noise. Calibration can correct process variations for each input signal.

Further, the embodiment can shorten the diagnostics imaging time in the radiological imaging apparatus. The conventional technology disclosed in JP-A No. 243858/2002 always forcibly adjusts a fast timing signal to the slow timing signal, i.e., the slew rate. Even when many events occur at high contribution of electron, time variations are expected to be remarkable due to noise in the comparator to detect timings or due to circuit offsets. By contrast, the embodiment uses the signal VE2 for observing the contribution of electron to determine a correction value for the timing signal. The embodiment can detect timing using a faster rising waveform for signals with high contribution of electron. On the average, the embodiment decreases timing variations and provides more effective counts than the conventional technology. It becomes possible to shorten the diagnostics imaging time in the radiological imaging apparatus.

Further, the embodiment can improve the diagnostics image contrast. Increasing time variations also increases chances of an error that leads to assume two signals to occur at the same time though they correspond to asynchronously occurring events of radiation incidence. Accordingly, the conventional technology disclosed in JP-A No. 243858/2002 seems to degrade the diagnostics image contrast due to incorrect detection. By contrast, the embodiment enables the diagnostics imaging to acquire more effective counts and therefore can improve the diagnostics image contrast.

Embodiment 2

Figure 9:
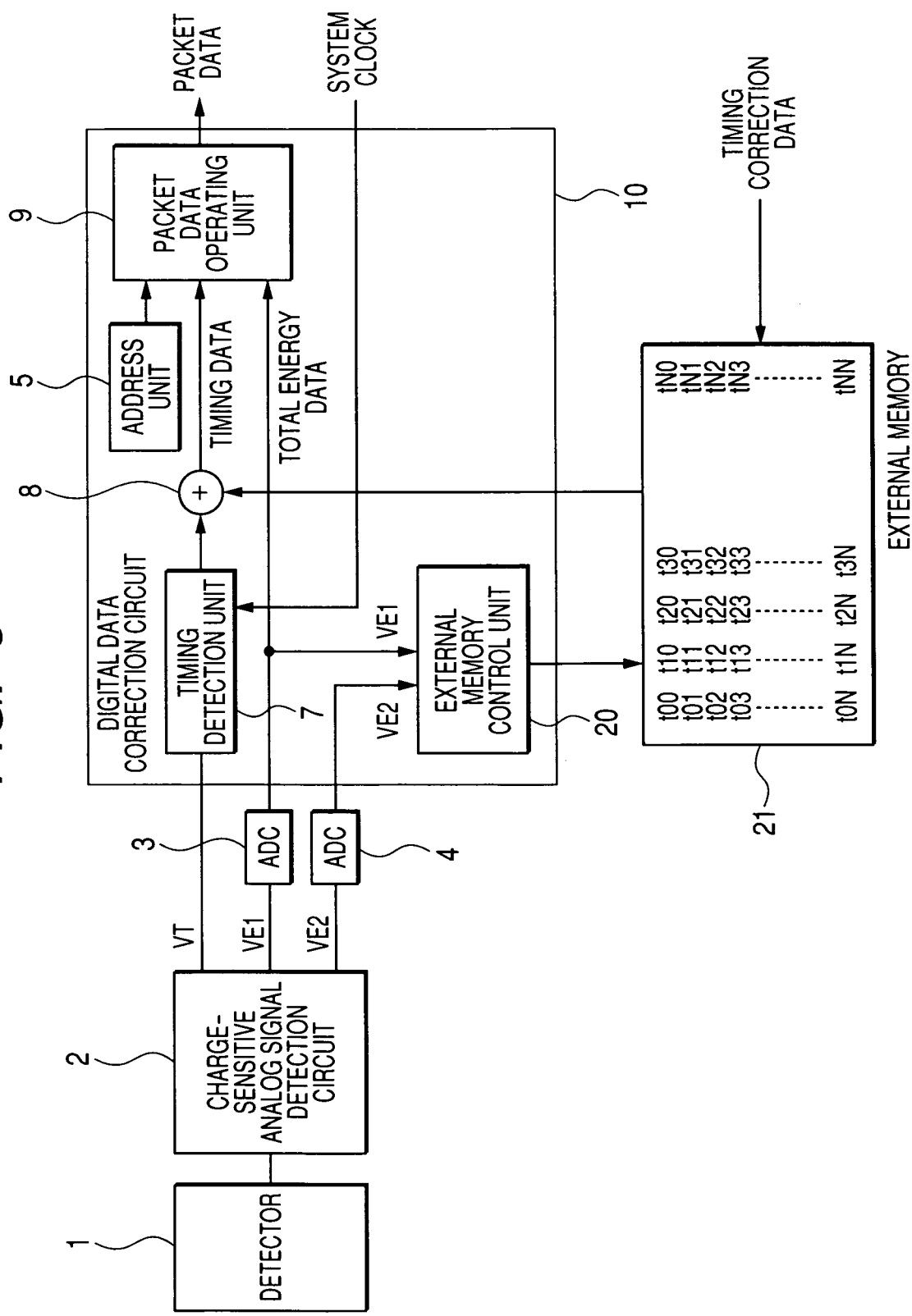
FIG. 9 shows a second embodiment of the radiation detection circuit in a PET/SPECT apparatus as an example of the radiological imaging apparatus according to the invention and shows a construction where a timing correction data table unit 6 is provided outside the digital data correction circuit 10.

FIG. 9 shows another embodiment of the construction of the timing correction data table unit 6 concerning the coincidence measurement in the radiological imaging apparatus using the semiconductor detector according to the invention. Embodiment 2 differs from embodiment 1 in that external memory is used for the timing correction data table unit 6 in the digital data correction circuit 10 according to embodiment 1. This aims at solving a problem where the table is too large to be stored in the digital data correction circuit 10. The PET/SPECT apparatus is composed of the detector 1, the charge-sensitive analog signal detection circuit 2, the analog/digital converters (ADCs) 3 and 4, the digital data correction circuit 10, and external memory 21. The digital data correction circuit 10 is composed of the detector address unit 5, the external memory control unit 20, a timing conversion circuit 7, the correction circuit 8, and the packet data generating unit 9. The timing conversion circuit 7 converts a timing signal into timing data according to the clock signal synchronized with the apparatus. Generally, multiple detectors 1 are provided in the PET/SPECT apparatus so as to surround a test object. Each of all the detectors 1 is connected to the corresponding charge-sensitive analog signal detection circuit 2 on a one-to-one basis. The charge-sensitive analog signal detection circuit 2 amplifies a weak pulse signal from the detector 1. The charge-sensitive analog signal detection circuit 2 outputs signals VT, VE1, and VE2. The signal VT represents incident timing. The signal VE1 is proportional to incident energy. The signal VE2 is proportional to the quantity of incident signals that contributed to electron transfer in the detector 1. Though not specified, the charge-sensitive analog signal detection circuit 2 is preferably constructed as an ASIC that integrates the charge-sensitive amplifier 13 and the comparator 14 in FIG. 2 as mentioned above. The signal VT is input to the timing detection unit 7 and is converted into timing data through a system clock. The signals VE1 and VE2 are converted into digital signals by the ADCs 3 and 4, respectively, and are then input to the digital data correction circuit 10. Though not specified, the digital data correction circuit 10 is preferably constructed as an FPGA that integrates the address unit 5, the external memory control unit 20, the timing detection unit 7, the correction circuit 8, and the packet data generating unit 9. The digital data correction circuit 10 determines an address of the external memory 21 that determines a timing signal correction value. Two pieces of energy data uniquely determine the correction value. The digital data correction circuit 10 reads the external memory 21 and supplies the read correction value as a correction signal to the correction circuit 8. The correction circuit 8 performs addition or subtraction between the timing signal output from the timing detection unit 7 and the correction signal to correct the timing signal. The correction circuit 8 then outputs the corrected timing signal. The corrected timing signal is supplied as timing data to the packet data generating unit 9. The address unit 5 generates an address signal. The address signal is supplied as address information to the packet data generating unit 9. The signal VE1 is output as a digital value from the ADC 3 and is input as energy data to the packet data generating unit 9. The packet data generating unit 9 unifies the address information, the timing data, and the energy data into one data packet and supplies it to the subsequent coincidence operating circuit to perform coincidence measurement for the entire PET/SPECT apparatus.

The embodiment provides the timing correction data table unit 6 using the large-capacity external memory outside the digital data correction circuit 10. This alleviates limitations on the size (capacity) of the timing correction data table unit 6. It becomes possible to provide more highly accurate correction values and improve the timing detection accuracy.

Embodiment 3

Figure 10:
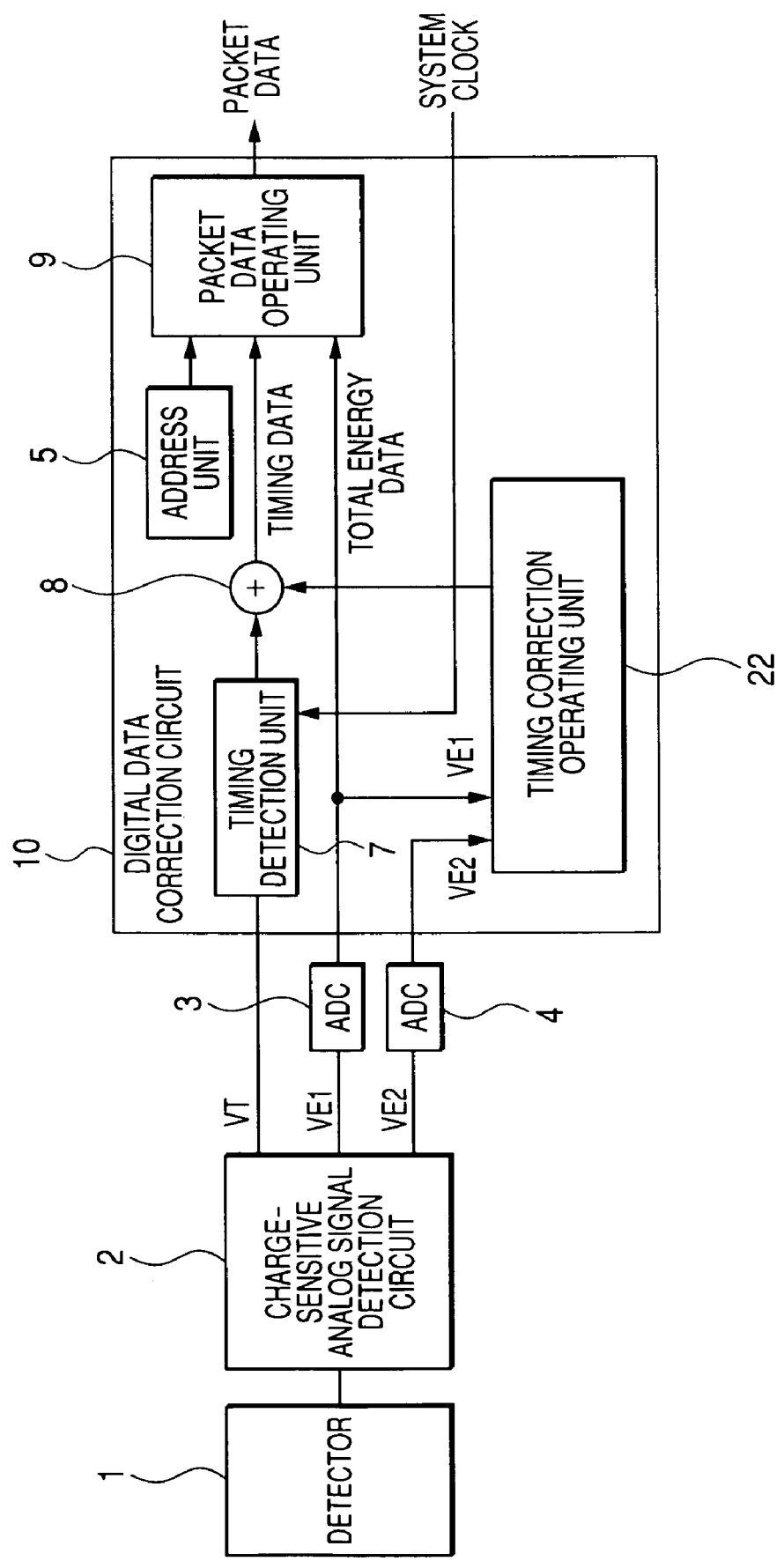
FIG. 10 shows a second embodiment of the radiation detection circuit in a PET/SPECT apparatus as an example of the radiological imaging apparatus according to the invention and shows a construction where a timing correction data table unit 6 is replaced by a timing correction operating unit 22.

FIG. 10 shows still another embodiment of the timing signal correction method concerning the coincidence measurement in the radiological imaging apparatus using the semiconductor detector according to the invention. Embodiment 3 differs from embodiment 1 in that the timing signal correction uses digital calculation instead of the table lookup method. That is, the timing correction data table unit 6 is replaced by a timing correction operating unit 22. The PET/SPECT apparatus is composed of the detector 1, the charge-sensitive analog signal detection circuit 2, the analog/digital converters (ADCs) 3 and 4, and the digital data correction circuit 10. The digital data correction circuit 10 is composed of the detector address unit 5, the timing correction operating unit 22, the timing conversion circuit 7, the correction circuit 8, and the packet data generating unit 9. The timing conversion circuit 7 converts a timing signal into timing data according to the clock signal synchronized with the apparatus. Generally, multiple detectors 1 are provided in the PET/SPECT apparatus so as to surround a test object. Each of all the detectors 1 is connected to the corresponding charge-sensitive analog signal detection circuit 2 on a one-to-one basis. The charge-sensitive analog signal detection circuit 2 amplifies a weak pulse signal from the detector 1. The charge-sensitive analog signal detection circuit 2 outputs signals VT, VE1, and VE2. The signal VT represents incident timing. The signal VE1 is proportional to incident energy. The signal VE2 is proportional to the quantity of incident signals that contributed to electron transfer in the detector 1. Though not specified, the charge-sensitive analog signal detection circuit 2 is preferably constructed as an ASIC that integrates the charge-sensitive amplifier 13 and the comparator 14 in FIG. 2 as mentioned above. The signal VT is input to the timing detection unit 7 and is converted into timing data through a system clock. The signals VE1 and VE2 are converted into digital signals by the ADCs 3 and 4, respectively, and are then input to the digital data correction circuit 10. Though not specified, the digital data correction circuit 10 is preferably constructed as an FPGA that integrates the address unit 5, the timing correction operating unit 22, the timing detection unit 7, the correction circuit 8, and the packet data generating unit 9. The digital data correction circuit 10 performs calculations to determine a timing signal correction value uniquely determined by [Expression 3] and [Expression 4] using two pieces of energy data. The correction value is supplied as a correction signal to the correction circuit 8.

$$t_1 = (t_h - t_e) \cdot \left( \frac{V_{LD}}{V_0 \cdot \alpha} - \beta \right) \quad \text{[Expression 3]}$$

$$t_2 = \frac{V_{LD}}{V_0} \cdot t_e \cdot \left( 1 - \frac{1}{\alpha} \right) \quad \text{[Expression 4]}$$

The correction circuit 8 performs addition or subtraction between the timing signal output from the timing detection unit 7 and the correction signal output correct the timing signal. The corrected timing signal is supplied as timing data to the packet data generating unit 9. The address unit 5 generates an address signal. The address signal is supplied as address information to the packet data generating unit 9. The signal VE1 is output as a digital value from the ADC 3 and is input as energy data to the packet data generating unit 9. The packet data generating unit 9 unifies the address information, the timing data, and the energy data into one data packet and supplies it to the subsequent coincidence operating circuit to perform coincidence measurement for the entire PET/SPECT apparatus.

Figure 11:
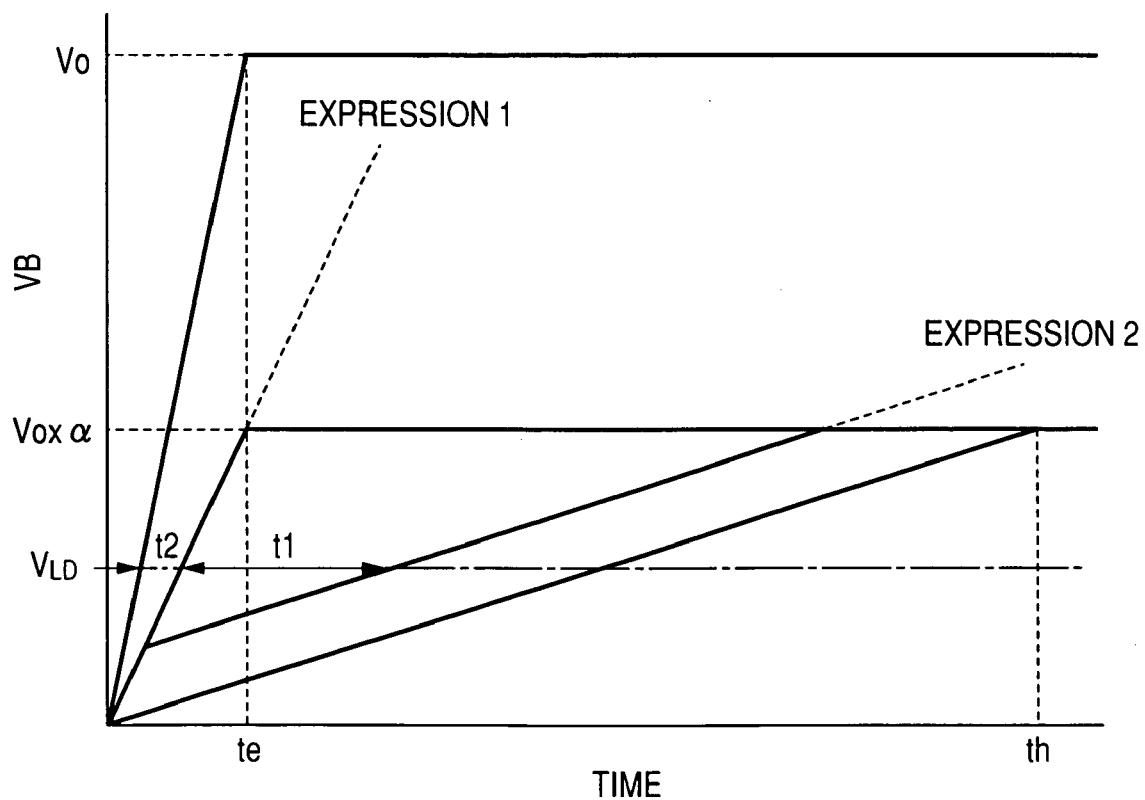
FIG. 11 shows relationship between output voltage VB from the charge-sensitive amplifier 13 and time t for finding a time difference as a basis for the method of correcting a timing signal according to the construction of the radiation detection circuit in FIG. 10.

FIG. 11 shows relationship between output voltage VB from the charge-sensitive amplifier 13 and time t for finding a time difference as a basis for the method of correcting a timing signal according to the construction of the radiation detection circuit in FIG. 10. Using FIG. 11, the following describes the time correction method to be performed when an incident position of radiation changes in the detector 1 and an input signal energy changes due to Compton scattering. When the radiation enters the detector 1 in FIG. 2, the incident energy quantity determines VE1. Compared to incidence of an energy lower than 511 keV due to scattering and the like, the comparator signal VB in FIG. 7A decreases the gradation in proportion to the input energy quantity as shown in [Expression 1].

$$v_1(t) = \frac{V_0 \cdot \alpha}{t_e} \cdot t \ (t < t_e \cdot \beta) \quad \text{[Expression 1]}$$

$$\alpha = \frac{VE1}{VE1(511)},$$

$$\beta = \frac{VE2}{VE1}$$

The phenomenon causes detection time error t2 with reference to threshold value VLD. Depending on a position of the detector 1 in FIG. 2 where the radiation enters, the signal quantity of VE2 attenuates at a rate uniquely determined by VE1. Accordingly, an electron contribution ratio of the signal decreases depending on a position of the semiconductor detector 1 where the radiation enters. In this case, as shown in FIG. 11, the gradient of the signal VB supplied to the comparator in FIG. 7A greatly decreases to cause time error t1 in the detected timing signal. The signals VE1 and VE2 are used to uniquely determine the errors t1 and t2 according to [Expression 3] and [Expression 4].

Even when an annihilation radiation (511 keV) is a source, for example, an energy of 511 keV or less may become an input signal due to scattering. In this case, the voltage output VB from the charge-sensitive amplifier 13 can be represented by v1(t) in [Expression 1]. As shown in FIG. 6, the time error of the timing signal results in t2. This variation quantity depends on VE1. When the contribution of electron is not 100%, the charge-sensitive amplifier 13 outputs the voltage VB as represented by v2(t) in [Expression 2].

$$v_2(t) = \frac{V_0 \cdot \alpha}{t_h} \cdot (t - t_e \cdot \beta) + V_0 \cdot \alpha \cdot \beta(t > t_e \cdot \beta) \quad \text{[Expression 2]}$$

Accordingly, the total timing variation (t1+t2) can be represented by the above-mentioned [Expression 3] and [Expression 4] dependent on α and β.

The timing signal correction method will be described as follow. When the timing signal reaches or exceeds the voltage threshold value VLD to determine the time detection for timing signals according to a ratio between VE1 and VE2, the method first determines whether the electron transfer or the hole transfer contributes to the gradient. [Expression 3] is used to find correction amount t1.

$$t_1 = (t_h - t_e) \cdot \left( \frac{V_{LD}}{V_0 \cdot \alpha} - \beta \right) \quad \text{[Expression 3]}$$

[Expression 3] is derived from [Expression 2] by assuming the timing error t1 between the timing for setting a comparator input voltage to VLD based on β=1 and the timing for setting a comparator input voltage to VLD based on β<1. Secondly, the method determines whether or not the incident signal results from scattering. [Expression 4] is used to find correction amount t2 at this time.

$$t_2 = \frac{V_{LD}}{V_0} \cdot t_e \cdot \left(1 - \frac{1}{\alpha}\right) \quad \text{[Expression 4]}$$

[Expression 4] is derived from [Expression 1] by assuming the timing error t2 between the timing for setting a comparator input voltage to VLD based on α=1 and the timing for setting a comparator input voltage to VLD based on α<1. This two-step correction process can correct the semiconductor detector's timing signal when no scattering occurs at the contribution of electron of 100%.

According to the embodiment, the correction using [Expression 3] and [Expression 4] can be operated only inside the digital data correction circuit 10. It becomes possible to acquire high-contrast or high-resolution images in the diagnostics time equivalent to that for apparatuses according to the conventional technology. In addition, the timing correction data table unit becomes unnecessary, simplifying the PET/SPECT apparatus construction.

Embodiment 4

Figure 12:
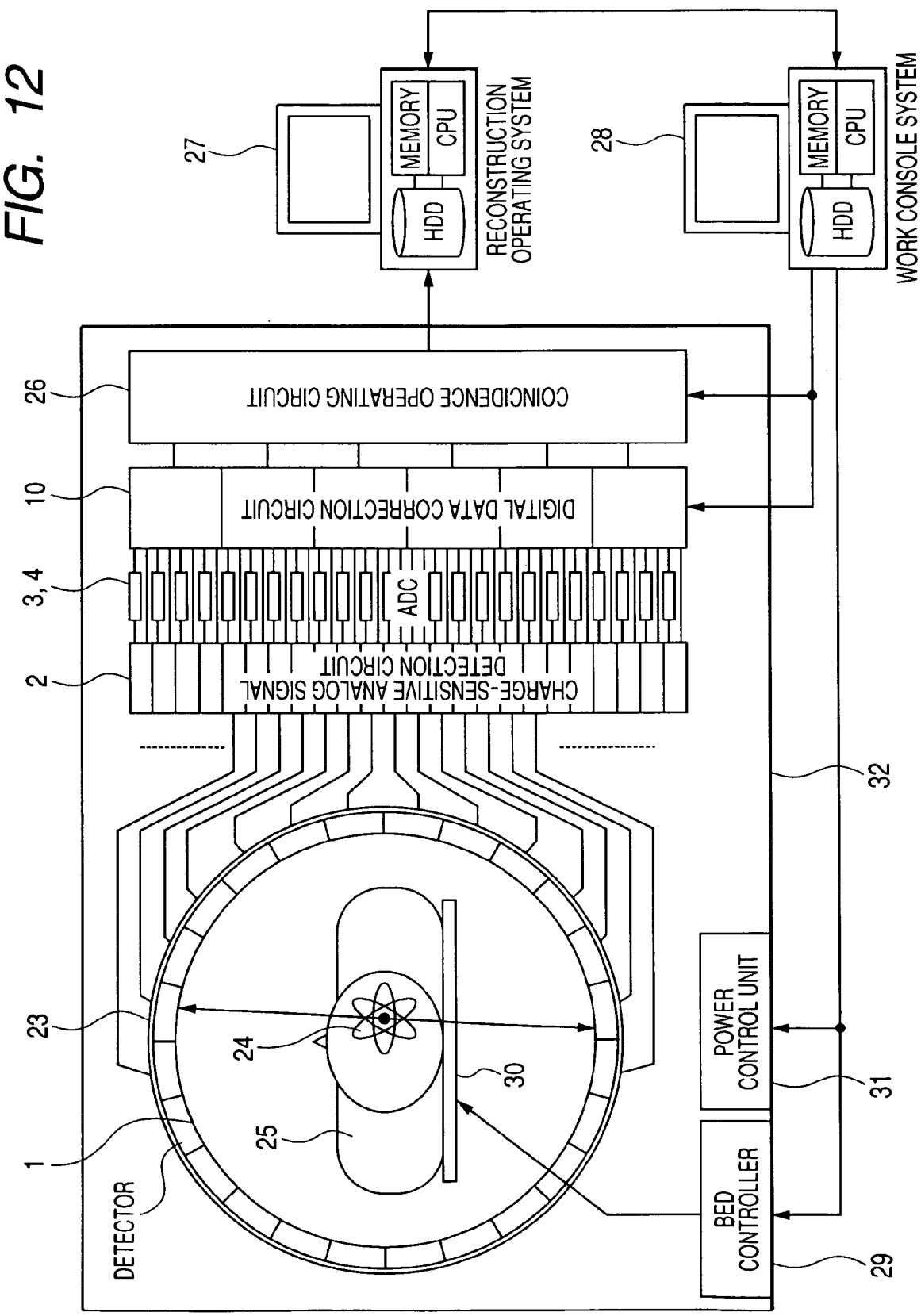
FIG. 12 shows an overall construction of the PET/SPECT apparatus using the radiation detection circuit according to the invention.

FIG. 12 shows an overall construction of the PET/SPECT apparatus using the radiation detection circuit according to the invention. The PET/SPECT apparatus is composed of a detector ring 23, the charge-sensitive analog signal detection circuit 2, the ADCs 3 and 4, the digital data correction circuit 10, a coincidence operating circuit 26, a reconstruction operating system 27, a bed 30, a bed controller 29, a power control unit 31, and a work console system 28. The detector ring 23 is made of multiple detectors 1 disposed in a ring shape. The charge-sensitive analog signal detection circuit 2 corresponds to each of the detectors 1. The detector ring is divided into a group of blocks. The digital data correction circuit 10 processes data for each group. The coincidence operating circuit 26 performs coincidence measurement using the overall data. The bed 30 supports a patient. The bed controller 29 controls bed positions and heights. The work console system 28 controls the digital data correction circuit.

A patient is dosed with medicine 24 for positron imaging and lies on the bed placed inside the ring of detectors 1. According to the medicine property, the medicine gathers around the patient's affected part and generates annihilation radiation (511 keV). The annihilation radiation reaches the detector and generates an electric charge corresponding to the absorbed energy. Each of the detectors is connected to the corresponding charge-sensitive analog signal detection circuit 2 to supply timing data to the digital data correction circuit 10. The ADCs 3 and 4 apply digital signal processes to input energy information and electron-contributed input energy information. The processed information is supplied to the digital data correction circuit. After correcting the timing data, the digital data correction circuit 10 transfers packet data to the subsequent coincidence operating circuit 26. The packet data is composed of a reacted detector's address, the timing data, and the energy data. The coincidence operating circuit determines the following condition to be an effective count: paired data is within a known timing window (approximately ranging from 10 to 20 ns) and the energy data satisfies a specified value. The effective count is stored as a chronological data sequence on a storage medium in the reconstruction operating system. An operator console controls turning on or off the apparatus and starting or stopping the measurement. The operator console loads timing correction data to the digital data correction circuit and provides settings inside the circuit. The operator console allows the coincidence operating circuit to specify an energy threshold value assumed to be coincident and a timing window. The operator console allows the bed controller to specify an area to scan the patient. The operator console provides the reconstruction operating system with information about the patient position.

The PET/SPECT apparatus using the semiconductor detector has the following problem. When the detector generates a signal, the contribution of electron and hole randomly changes to also randomly change the detection time in the range of 100 to 200 ns. The embodiment can solve this problem. Specifically, the embodiment can correct timing data using energy data supplied to the detector and energy data the electron contributed. The embodiment increases the count of effective data that can be assumed to be coincident within a given timing window. As a result, the embodiment can shorten the time to acquire data needed for the reconstruction and therefore shorten the diagnostics time. There may be an accidental event that assumes noncoincident data to be coincident due to a time error. That data appears as a noise in image data after reconstruction. There is a possibility of decreasing the contrast or causing wrong diagnosis. In such case, performing the time correction decreases incorrect counts, making it possible to improve the image quality after the reconstruction.

What is claimed is:

1. A radiation detection circuit that is connectable to an output side of a semiconductor detector and that allows the semiconductor detector to supply a current pulse signal having intensity corresponding to an input energy of radiation, and that outputs input energy information and incident timing data of the radiation based on the current pulse signal intensity, wherein the incident timing data is generated from the current pulse signal caused by mobility of electrons and holes and from a predetermined threshold, and wherein a correction amount of the incident timing data depends upon a contribution of an electron and a contribution of a hole, and wherein said radiation detection circuit includes a filter having a time constant according to electron mobility and is constructed to acquire information about the contribution of electron from the current pulse signal intensity using the filter, and to output the information to a digital data correction circuit configured to correct the incident timing data by the correction amount.

2. The radiation detection circuit according to claim 1, wherein the incident timing data is output based on a result of a comparison performed by the radiation detection circuit between a voltage signal proportional to the current pulse signal intensity and a specified voltage threshold value.

3. The radiation detection circuit according to claim 2, wherein the incident timing data output includes a time error.

4. The radiation detection circuit according to claim 3, wherein information about the contribution of electron is output to the digital data correction circuit so that the digital data correction circuit corrects the time error.

5. The radiation detection circuit according to claim 2, wherein the specified voltage threshold value is generated inside the radiation detection circuit.

6. The radiation detection circuit according to claim 2, wherein the specified voltage threshold value is supplied from outside the radiation detection circuit.

7. The radiation detection circuit according to claim 1, wherein the radiation detection circuit has a function of maintaining a specified signal-to-noise ratio against a noise supplied from the semiconductor detector.

8. The radiation detection circuit according to claim 1, wherein process variations can be corrected for each input signal by calibrating the input energy information and the information about the contribution of electron.

9. A radiation detection circuit comprising:

a charge-sensitive amplifier that is connectable to an output side of a semiconductor detector and that receives a current pulse signal with an intensity corresponding to a radiation input energy from the semiconductor detector, and that outputs a voltage signal proportional to the current pulse signal intensity;

a first shaper that uses a first time constant larger than a hole transfer time in said semiconductor detector to limit and pass a band of a voltage signal output from the charge-sensitive amplifier;

a second shaper that uses a second time constant equivalent in level to an electron transfer time in said semiconductor detector to limit and pass a band of a voltage signal output from the charge-sensitive amplifier using a filter having a time constant according to electron mobility;

a first peak hold that holds an analog peak hold value for an output signal from the first shaper;

a second peak hold that holds an analog peak hold value for an output signal from the second shaper; and a comparator that compares a voltage signal output from the charge-sensitive amplifier with a specified voltage threshold value and that outputs a comparison result as timing data, wherein the timing data is generated from the current pulse signal caused by mobility of electrons and holes and from a predetermined threshold, and wherein a correction amount of the timing data depends upon a contribution of an electron and a contribution of a hole, and wherein the radiation detection circuit is configured to correct the timing data by the correction amount, and wherein the radiation detection circuit is constructed to output to the digital data correction circuit a first analog peak value representing a peak value of an output signal from the first shaper and a second analog peak value representing a peak value of an output signal from the second shaper.

10. The radiation detection circuit according to claim 9, wherein the timing data is output based on a result of a comparison performed by the radiation detection circuit between a voltage signal proportional to the current pulse signal intensity and a specified voltage threshold value.

11. The radiation detection circuit according to claim 10, wherein the timing data output includes a time error.

12. The radiation detection circuit according to claim 11, wherein the second analog peak value is output to the digital data correction circuit so that the digital data correction circuit corrects the time error.

13. The radiation detection circuit according to claim 10, wherein the specified voltage threshold value is generated inside the radiation detection circuit.

14. The radiation detection circuit according to claim 10, wherein the specified voltage threshold value is supplied from outside the radiation detection circuit.

15. The radiation detection circuit according to claim 9, wherein the radiation detection circuit has a function of maintaining a specified signal-to-noise ratio against a noise supplied from the semiconductor detector.

16. The radiation detection circuit according to claim 9, wherein process variations can be corrected for each input signal by calibrating the first and second analog peak values.

17. A radiological imaging apparatus comprising:

a semiconductor detector that is composed of a semiconductor device and that outputs a current pulse signal with an intensity corresponding to a radiation input energy;

a charge-sensitive analog signal detection circuit that is connected to the semiconductor detector and that receives a current pulse signal output from the semiconductor detector, outputs first timing data representing a timing for a radiation to enter the semiconductor detector and first energy data proportional to an incident radiation energy, acquires first electron contribution energy data proportional to a ratio of electron contribution to the current pulse signal, by using a filter having a time constant according to electron mobility, and outputs the first electron contribution energy data; and a digital data correction circuit that inputs the first timing data, the first energy data, and the electron contribution energy data, that corrects timing for a radiation to enter the semiconductor detector by a correction amount, and that outputs corrected timing data, wherein the first timing data is generated from the current pulse signal caused by mobility of electrons and holes and from a predetermined threshold, and wherein the correction amount of the timing depends upon a contribution of an electron and a contribution of a hole.

18. The radiological imaging apparatus according to claim 17, wherein the digital data correction circuit includes a timing detection unit that is supplied with the first timing data output from the charge-sensitive analog signal detection circuit and converts the first timing data into second timing data in accordance with a clock signal synchronized with a system.

19. The radiological imaging apparatus according to claim 18,
wherein the digital data correction circuit further includes a timing correction data table unit,
wherein the timing correction data table unit is constructed to output a correction value for the second timing data based on second energy data generated by converting the first energy data into a digital value and based on second electron contribution energy data generated by converting the first electron contribution energy data into a digital value, and
wherein third timing data is generated from the second timing data and the correction value.

20. The radiological imaging apparatus according to claim 18,
wherein the digital data correction circuit further includes a timing correction operating unit,
wherein the timing correction operating unit is constructed to calculate and output a correction value for the second timing data based on second energy data generated by converting the first energy data into a digital value and based on second electron contribution energy data generated by converting the first electron contribution energy data into a digital value, and
wherein third timing data is generated from the second timing data and the correction value.

* * * * *